United States Patent
Elkind

[19]

[11] Patent Number: 6,119,258
[45] Date of Patent: *Sep. 12, 2000

[54] VIDEO ERROR/DISTORTION CHECKER

[75] Inventor: Bob Elkind, Gaston, Oreg.

[73] Assignee: Tektronix, Inc., Beaverton, Oreg.

[*] Notice: This patent issued on a continued prosecution application filed under 37 CFR 1.53(d), and is subject to the twenty year patent term provisions of 35 U.S.C. 154(a)(2).

[21] Appl. No.: 09/047,979

[22] Filed: Mar. 25, 1998

(Under 37 CFR 1.47)

Related U.S. Application Data

[63] Continuation of application No. 08/638,057, Apr. 25, 1996, Pat. No. 5,832,003.

[51] Int. Cl.[7] .................................................... G01R 31/28
[52] U.S. Cl. ........................................ 714/745; 714/822
[58] Field of Search .................................. 714/794, 799, 714/822, 819, 820, 821, 704, 745; 324/606; 327/58, 63, 90, 93

[56] References Cited

U.S. PATENT DOCUMENTS

| | | | |
|---|---|---|---|
| 4,451,921 | 5/1984 | Odaka | 371/48 |
| 5,307,330 | 4/1994 | Okamura | 369/32 |
| 5,488,618 | 1/1996 | Kondo et al. | 371/67.1 |
| 5,585,954 | 12/1996 | Taga et al. | 359/158 |
| 5,610,541 | 3/1997 | Yoon | 327/143 |
| 5,832,003 | 11/1998 | Elkind | 371/48 |

*Primary Examiner*—Christine Trinh L. Tu
*Attorney, Agent, or Firm*—Francis I. Gray

[57] ABSTRACT

A video error/distortion checker generates a difference signal from an input repetitive digital signal and a reference data signal corresponding to the input repetitive digital signal. The difference signal is compared with maximum and minimum threshold values to generate an error signal when the difference signal exceeds either threshold value. The difference signal also is used to generate a running range value that is compared with a total range value to produce the error signal when during one iteration of the repetitive digital signal the difference signal exceeds a specified range defined by the total range value. The error signal is suitably displayed, either visually or alphanumerically or both, so that an operator may recognize the type, severity and location of errors in the repetitive digital signal.

9 Claims, 1 Drawing Sheet

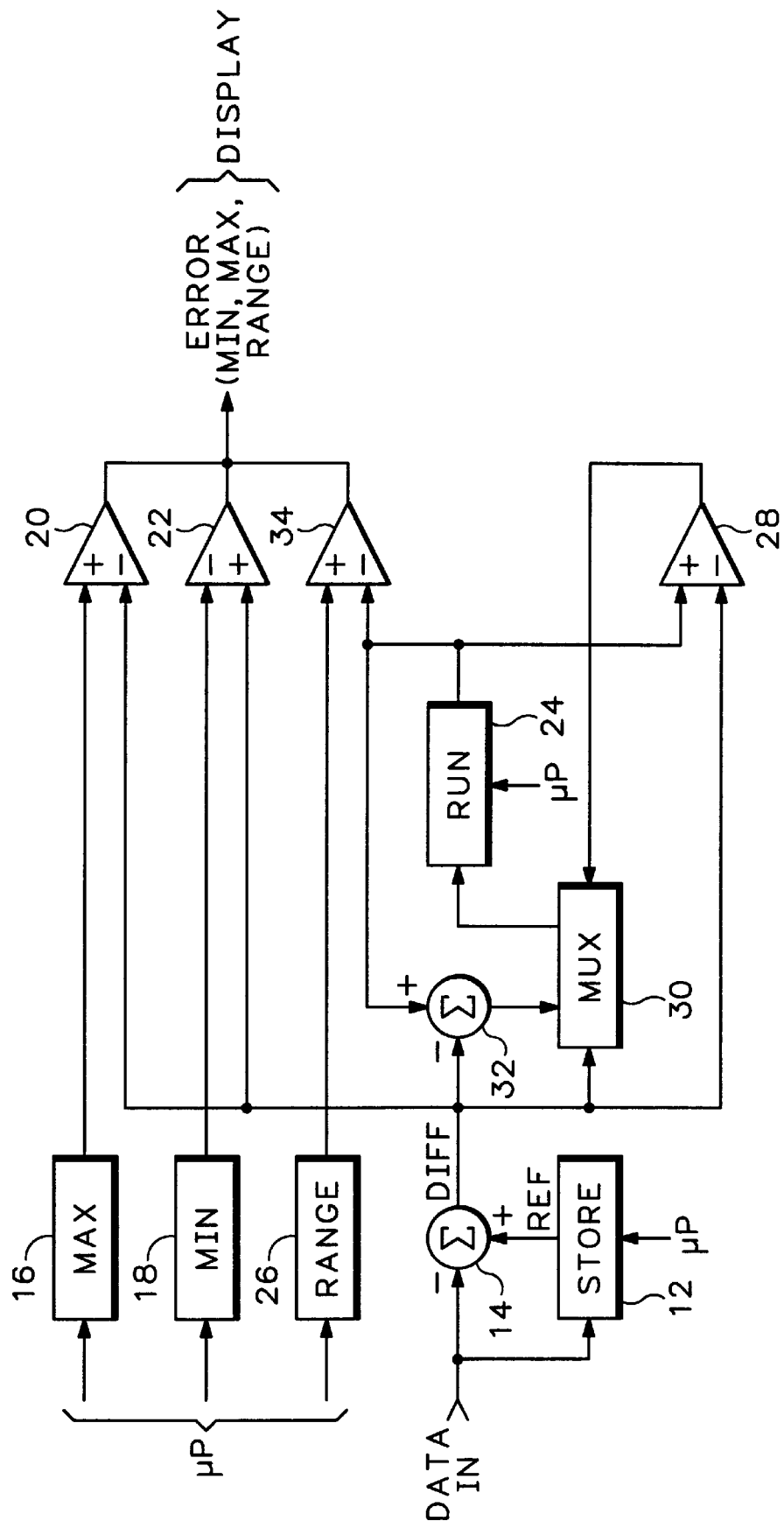

VIDEO ERROR/DISTORTION CHECKER

CROSS-REFERENCE TO RELATED APPLICATIONS

This application is a continuation of U.S. patent application Ser. No. 08/638,057 filed Apr. 25, 1996, which subsequently issued on Nov. 3, 1998 as U.S. Pat. No. 5,832,003.

BACKGROUND OF THE INVENTION

The present invention relates to the verification of proper operation of equipment, and more particularly to a video error/distortion checker for evaluating whether equipment is operating within acceptable margins of error or is seriously malfunctioning.

A straight forward method of detecting errors in digital video equipment is to store in a buffer a copy of a repetitive signal and to compare the stored, or reference, signal to successive occurrences of the repetitive signal. An exact match between the reference signal and the received signal within specified limits indicates a properly functioning system. Various oscilloscopes, such as the Tektronix 2400 Series Digitizing Oscilloscopes manufactured by Tektronix, Inc. of Wilsonville, Oreg., United States of America, implement automatic pass/fail testing by comparing incoming signals against reference waveforms and alerting the operator in some manner if the incoming signal is out of limits. In two application areas such exact comparisons are not an adequate indicator of equipment quality. The first application is for PAL composite digital systems, and the second application is where non-lossless data compression is used.

In the first application a PAL composite digital signal is sometimes generated in a form commonly called "1135H" for its low cost, and then processed by a method called "sample rate conversion" to a form that is commonly called "4FSC", which is the required form for PAL composite digital signals. The sample rate conversion process introduces small uncertainties in the signal data, and the results of the introduced uncertainties vary over time. A constant signal in 1135H form processed to 4FSC form is no longer constant from video frame to video frame.

In the second application data compression is used to express an image or signal in a form that requires fewer data than an uncompressed signal. The compressed signal is ultimately decompressed, but the compression and decompression processing usually results in a signal that does not exactly match the original uncompressed signal.

What is desired is a video error/distortion checker that can distinguish between digital equipment operating within normal and acceptable error margins and digital equipment that is seriously malfunctioning for signals that are not exact replications of the original signal.

SUMMARY OF THE INVENTION

Accordingly the present invention provides a video error/distortion checker for verifying proper operation of digital equipment used with either PAL composite signals, data compressed signals, or non-lossless processed signals. A video frame buffer stores an iteration of a repetitive signal, the stored signal being a reference signal. Subsequent iterations of the repetitive signal are arithmetically subtracted on a data word by data word basis from the reference signal to form difference values. The difference values are compared with maximum and minimum threshold values contained in maximum and minimum threshold registers. The difference values also are compared to a running value in a running register, the running register being initialized with the minimum threshold value at the beginning of each iteration, by writing as the running value the difference value into the running register when the difference value is greater than the running value and an intermediate running value when the difference value is less than the running value, the intermediate running value being obtained by subtracting the difference value from the running value. The running value is compared with a total range value from a range register to determine whether an acceptable total range has been exceeded. The occurrence of errors may be visually and/or alphanumerically displayed to provide a recognizable indication with regard to their temporal location, severity and type.

The objects, advantages and novel features of the present invention are apparent from the following detailed description when read in conjunction with the appended claims and attached drawing.

BRIEF DESCRIPTION OF THE DRAWING

The FIGURE is a block diagram view of a video error/distortion checker according to the present invention.

DESCRIPTION OF THE PREFERRED EMBODIMENT

Referring now to the FIGURE a buffer memory 12 contains a reference signal REF in the form of data words that represent an iteration of a repetitive signal. REF may be obtained from a repetitive data input signal DATA IN, such as a television standard video signal, or from a microprocessor (not shown). DATA IN is input to a summing circuit 14 for subtraction from the reference signal from the buffer memory 12 to produce a difference signal DIFF. The microprocessor loads a pair of registers 16, 18 with a maximum threshold value and a minimum threshold value, respectively. DIFF is input to a pair of comparators 20, 22 for comparison with the maximum and minimum threshold values respectively. If either threshold value is exceeded by DIFF, an error signal ERROR is generated, indicating that DATA IN has exceeded the specified thresholds.

A running register 24 is initially loaded by the microprocessor with the minimum threshold value as a running value at the beginning of each iteration of DATA IN by the microprocessor. A range register 26 is loaded with a total range value by the microprocessor. The running value is input to a running comparator 28 for comparison with DIFF. The output of the running comparator 28 provides a select signal for a multiplexer 30. The running value also is input to a running summation circuit 32. DIFF is subtracted from the running value in the running summation circuit 32, and the result is input to one input of the multiplexer 30. DIFF is input to the other input of the multiplexer 30. The output of the multiplexer 30 is input as a new running value to the running register 24. The running value also is input to a range comparator 34 where it is compared with the total range value from the range register 26. If the running value exceeds the total range value, then ERROR is generated.

ERROR may be displayed as indicated in the research disclosure by Bob Elkind et al entitled "Visual Video Clipping Level Indication Display" published in the March 1996 Number 383 issue of *The International Journal for companies seeking an alternative or supplement to obtaining patents* on pages 199–200 incorporated herein by reference. Each error point in ERROR may be represented by a specified grey scale or color value, and the type of error point, MAX, MIN or RANGE, may be specified with a different specified value. The result is a display that provides ready recognition of the type, severity and location of error points generated from DATA IN. The microprocessor may keep track of the errors to provide an error summary in the form of an alphanumeric display in addition to or instead of the visual display.

In the case of input signal formats that include multiple channels, such as component video signals with luminance and two chrominance channels, this circuit would be replicated for each channel, and the results would be displayed differently so that the particular channel producing the error could also be identified.

Alternatively the video error/distortion checker may be implemented as a software program running on a general purpose computer or computer processor that receives as input DATA IN and generates ERROR as an output.

Thus the present invention provides a video error/distortion checker that subtracts a repetitive input data signal from a reference signal to generate a difference value for each data word, and then compares the difference value with maximum and minimum values and generates a running range value for comparison with a total range value to generate an error signal when the respective limits are exceeded.

What is claimed is:

1. A digital signal error detector comprising:

a memory for storing a reference data signal that represents an iteration of a repetitive input data signal;

a summation circuit for subtracting the input data signal from the reference data signal to produce a signal difference value signal; and a limit detector to which the signal difference value signal is input for comparing the signal difference value signal with specified minimum and maximum threshold values to generate an error signal when the signal difference value signal is outside the specified minimum and maximum threshold values.

2. The digital signal error detector as recited in claim 1 wherein the limit detector comprises:

a limit register for storing the specified minimum and maximum threshold values; and a comparator to which the signal difference value signal and the specified minimum and maximum threshold values from the limit register are input for generating the error signal when the signal difference value signal is outside the specified minimum and maximum threshold values.

3. The digital signal error detector as recited in claim 2 wherein the limit register comprises:

a maximum register for storing the specified maximum threshold value; and a minimum register for storing the specified minimum threshold value.

4. The digital signal error detector as recited in claim 3 wherein the comparator comprises:

a maximum comparator for comparing the specified maximum threshold value with the signal difference value signal to generate the error signal when the signal difference value signal is greater than the specified maximum threshold value; and a minimum comparator for comparing the specified minimum threshold value with the signal difference value signal to generate the error signal when the signal difference value signal is less than the specified minimum threshold value.

5. The digital signal error detector as recited in claim 4 wherein the difference generator comprises:

a memory for storing the reference data signal; and a summation circuit for subtracting the input data signal from the reference data signal to produce the signal difference value signal.

6. The digital signal error detector as recited in claim 1 further comprising a range detector for generating the error signal when a running difference value signal derived from the signal difference value signal exceeds a total range value.

7. A method of detecting errors in a repetitive digital signal comprising the steps of:

storing a reference data signal in a memory;

subtracting the repetitive digital signal from the reference data signal from the memory to generate a signal difference value signal, the reference data signal representing an iteration of the repetitive digital signal; and comparing the signal difference value signal with specified maximum and minimum threshold values to detect when the signal difference value signal is outside the specified maximum and minimum threshold values to generate an error signal.

8. The method as recited in claim 7 further comprising the step of detecting during each iteration of the repetitive digital signal whether the signal difference value signal fluctuates over a range of values greater than a total range value to generate the error signal.

9. The method as recited in claim 7 wherein the detecting step comprises the steps of:

storing the specified threshold value in a threshold register; and comparing the signal difference value signal with the specified minimum and maximum threshold values from the threshold register to generate the error signal when the signal difference value signal is outside the specified minimum and maximum threshold values.

* * * * *